(12) United States Patent
Kubo

(10) Patent No.: US 10,344,859 B2
(45) Date of Patent: Jul. 9, 2019

(54) AUTOMATIC TRANSMISSION

(71) Applicant: HONDA MOTOR CO., LTD., Tokyo (JP)

(72) Inventor: Naoyuki Kubo, Wako (JP)

(73) Assignee: HONDA MOTOR CO., LTD, Tokyo (JP)

(*) Notice: Subject to any disclaimer, the term of this patent is extended or adjusted under 35 U.S.C. 154(b) by 0 days.

(21) Appl. No.: 15/914,207

(22) Filed: Mar. 7, 2018

(65) Prior Publication Data

US 2018/0266556 A1    Sep. 20, 2018

(30) Foreign Application Priority Data

Mar. 15, 2017 (JP) ................. 2017-050150

(51) Int. Cl.
| | |
|---|---|
| *F16H 63/50* | (2006.01) |
| *F02D 35/00* | (2006.01) |
| *F02D 41/02* | (2006.01) |
| *F16H 3/44* | (2006.01) |
| *F16H 3/66* | (2006.01) |

(52) U.S. Cl.
CPC ......... *F16H 63/50* (2013.01); *F02D 35/0007* (2013.01); *F02D 41/0215* (2013.01); *F02D 2200/101* (2013.01); *F02D 2200/501* (2013.01); *F02D 2250/18* (2013.01); *F02D 2250/21* (2013.01); *F02D 2400/12* (2013.01); *F16H 3/66* (2013.01); *F16H 2003/445* (2013.01); *F16H 2200/0069* (2013.01); *F16H 2200/2012* (2013.01); *F16H 2200/2046* (2013.01);

(Continued)

(58) Field of Classification Search
None
See application file for complete search history.

(56) References Cited

U.S. PATENT DOCUMENTS

| | | |
|---|---|---|
| 6,625,531 B2 | 9/2003 | Yasuoka et al. |
| 7,739,018 B2 | 6/2010 | Adachi |

(Continued)

FOREIGN PATENT DOCUMENTS

| | | | |
|---|---|---|---|
| JP | H05-240330 A | 9/1993 | |
| JP | 2000-104575 A | 4/2000 | |

(Continued)

OTHER PUBLICATIONS

Decision to Grant (w/ English translation) issued for Japanese Patent Application No. 2017-050150 dated Dec. 21, 2018.

*Primary Examiner* — Dirk Wright
(74) *Attorney, Agent, or Firm* — Thomas | Horstemeyer, LLP

(57) ABSTRACT

An automatic transmission includes a main shaft, a counter shaft, a transmission mechanism capable of establishing a plurality of gear ranges by switching a transmission path of a driving force transmitted from the main shaft to the counter shaft by a combination of engagement and release of a plurality of engaging mechanisms, a determination unit configured to determine whether the transmission mechanism is switching the gear range, and a switching unit configured to switch information of a moment of inertia about the main shaft, which is used for control, between first information during establishment of the gear range and second information during switching of the gear range based on a determination result of the determination unit.

5 Claims, 7 Drawing Sheets

(52) U.S. Cl.
CPC ............ *F16H 2200/2066* (2013.01); *F16H 2200/2082* (2013.01); *Y02T 10/76* (2013.01)

(56) References Cited

U.S. PATENT DOCUMENTS

| | | | |
|---|---|---|---|
| 7,803,086 B2* | 9/2010 | Tabata | B60W 20/40 477/3 |
| 8,135,517 B2* | 3/2012 | Lupo | B60W 30/20 180/65.1 |
| 10,023,181 B2* | 7/2018 | Atarashi | B60K 6/445 |

FOREIGN PATENT DOCUMENTS

| | | |
|---|---|---|
| JP | 2001-182816 A | 7/2001 |
| JP | 2002-036918 A | 2/2002 |
| JP | 2007-292036 A | 11/2007 |
| JP | 2010-084691 A | 4/2010 |

\* cited by examiner

FIG. 2A

|      | C1 | C2 | C3 | B1 | B2 | B3 | F1  | GEAR RATIO |
|------|----|----|----|----|----|----|-----|------------|
| RVS  |    |    | ○  |    | ○  |    | ○   | 4.008      |
| 1st  |    |    |    | ○  | ○  | (○)| △/○ | 5.233      |
| 2nd  |    | ○  |    | ○  | ○  |    | (△) | 3.367      |
| 3rd  |    |    | ○  | ○  | ○  |    | (△) | 2.298      |
| 4th  |    | ○  | ○  | ○  |    |    | (△) | 1.705      |
| 5th  | ○  |    | ○  | ○  |    |    | (△) | 1.363      |
| 6th  | ○  | ○  | ○  |    |    |    | (△) | 1.000      |
| 7th  | ○  |    | ○  |    | ○  |    | (△) | 0.786      |
| 8th  | ○  | ○  |    |    | ○  |    | (△) | 0.657      |
| 9th  | ○  |    |    |    | ○  | ○  | (△) | 0.584      |
| 10th | ○  | ○  |    |    |    | ○  | (△) | 0.520      |
| P/N  |    |    |    |    |    |    | △/○ | —          |

FIG. 2B

| PLANETARY GEAR MECHANISM | GEAR RATIO |
|--------------------------|------------|
| P1                       | 2.681      |
| P2                       | 1.914      |
| P3                       | 1.614      |
| P4                       | 2.734      |

FIG. 5A

| GEAR RANGE | MOMENT OF INERTIA INFORMATION (INCLUDING COUNTER SHAFT AND THE LIKE) |
|---|---|
| 1st | ... |
| 2nd | ... |
| 3rd | ... |
| 4th | ... |
| 5th | ... |
| 6th | ... |
| 7th | ... |
| 8th | ... |
| 9th | ... |
| 10th | ... |

FIG. 5B

| SWITCHING | MOMENT OF INERTIA INFORMATION (EXCLUDING COUNTER SHAFT AND THE LIKE) |
|---|---|
| 1-2 | ... |
| 2-3 | ... |
| 3-4 | ... |
| 4-5 | ... |
| 5-6 | ... |
| 6-7 | ... |
| 7-8 | ... |
| 8-9 | ... |
| 9-10 | ... |

F I G. 7A
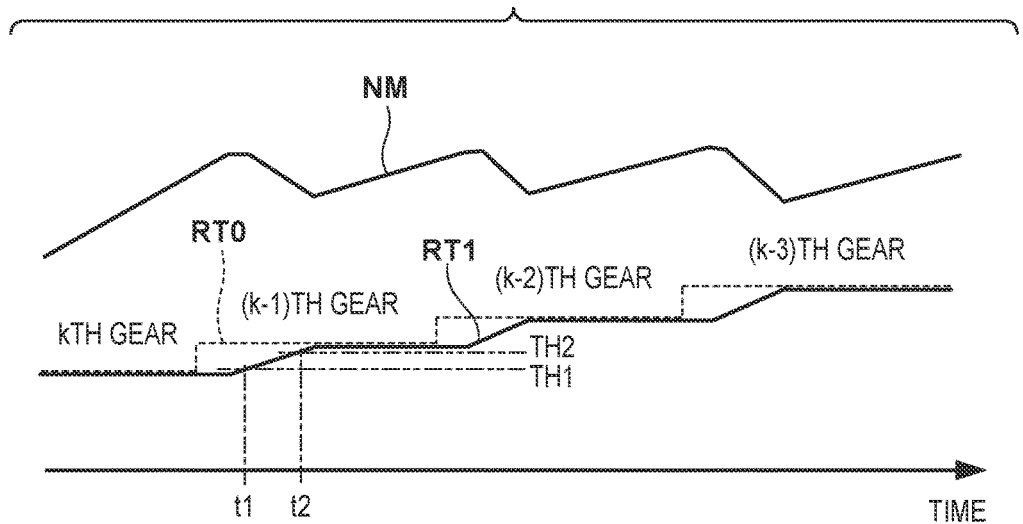
F I G. 7B
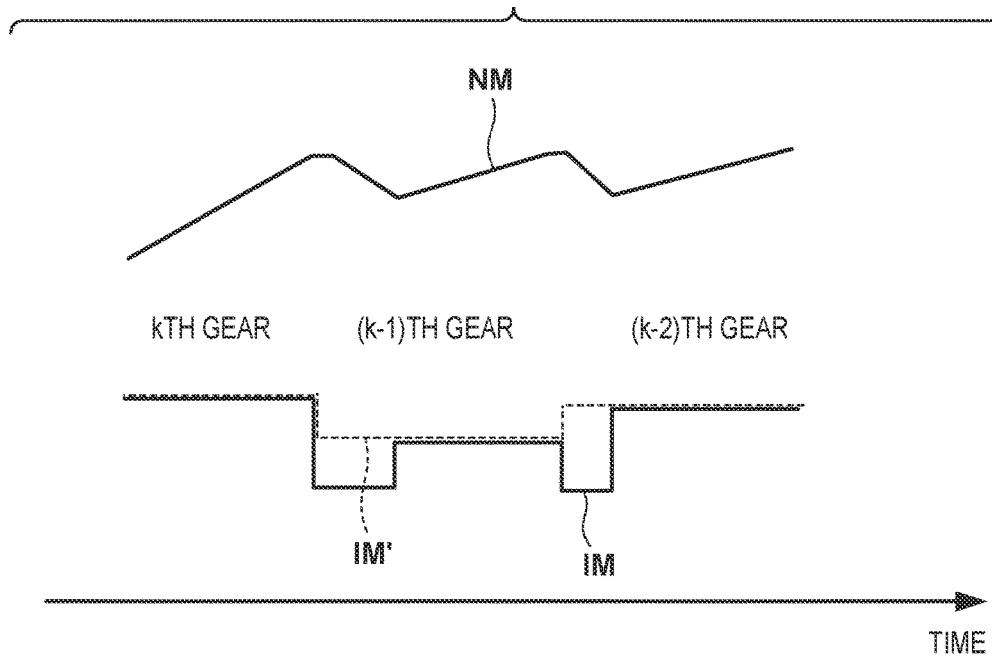

AUTOMATIC TRANSMISSION

BACKGROUND OF THE INVENTION

Field of the Invention

The present invention relates to an automatic transmission.

Description of the Related Art

There is proposed a system that executes control of an engine in cooperation with an automatic transmission by communication between the ECU of the automatic transmission and the ECU of the engine (for example, Japanese Patent Laid-Open No. 2010-84691).

The information of a moment of inertia about the main shaft of an automatic transmission is used for control of the output torque of an engine or the like. However, the moment of inertia about the main shaft varies depending on the state of the automatic transmission. The accuracy of the information of the moment of inertia is required to be high.

SUMMARY OF THE INVENTION

It is an object of the present invention to improve the accuracy of the information of a moment of inertia about a main shaft.

According to an aspect of the present invention, there is provided an automatic transmission comprising: a main shaft; a counter shaft; a transmission mechanism capable of establishing a plurality of gear ranges by switching a transmission path of a driving force transmitted from the main shaft to the counter shaft by a combination of engagement and release of a plurality of engaging mechanisms; a determination unit configured to determine whether the transmission mechanism is switching the gear range; and a switching unit configured to switch information of a moment of inertia about the main shaft, which is used for control, between first information during establishment of the gear range and second information during switching of the gear range based on a determination result of the determination unit.

Further features of the present invention will become apparent from the following description of exemplary embodiments (with reference to the attached drawings).

BRIEF DESCRIPTION OF THE DRAWINGS

FIG. 2A is a view showing an example of the engagement table of engaging mechanisms;

FIG. 2B is a view showing the gear ratios of planetary gear mechanisms;

FIGS. 5A and 5B are views showing examples of moment of inertia information;

FIG. 7A is a view showing an example of determining whether a gear range is being switched; and FIG. 7B is a view for explaining an advantage in switching the moment of inertia information.

DESCRIPTION OF THE EMBODIMENTS

Figure 1:
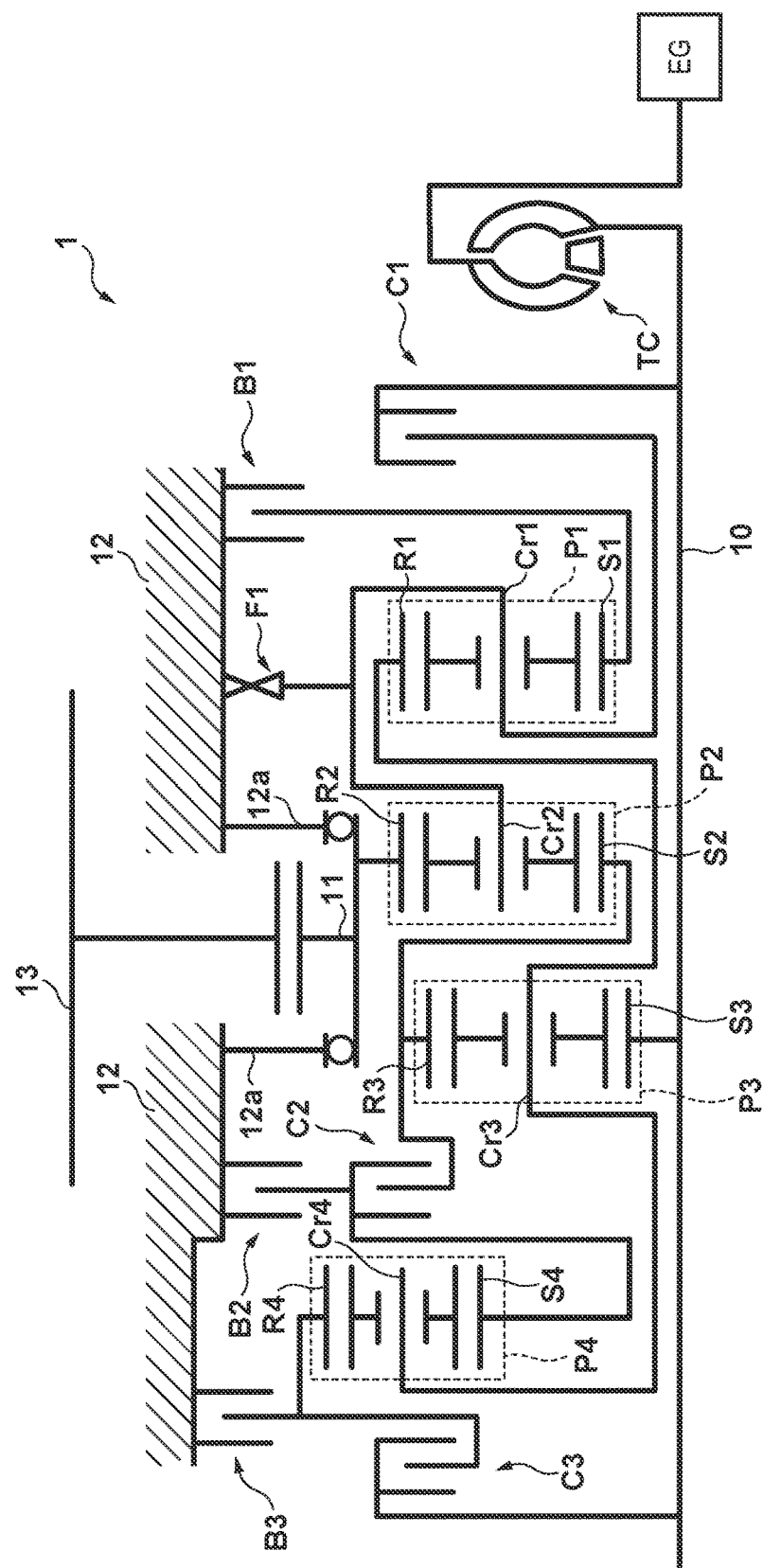
FIG. 1 is a skeleton diagram of an automatic transmission according to an embodiment of the present invention.

FIG. 1 is a skeleton diagram of an automatic transmission 1 according to an embodiment of the present invention.

Referring to FIG. 1, the automatic transmission 1 includes a main shaft (input shaft) 10 rotatably axially supported in a casing 12 that forms a transmission case, an output member 11 rotatably supported by support members 12a supported in the casing 12 so as to be coaxial with respect to the main shaft 10, and a counter shaft (output shaft) 13.

A driving force from an engine EG (to be sometimes simply referred to as EG) that is an internal combustion engine is input to the main shaft 10, and the main shaft 10 is rotated by the driving force. A starting device is provided between the main shaft 10 and the engine EG. Examples of the starting device are a clutch type starting device (single disc clutch, multiple disc clutch, or the like) and a hydraulic coupling type starting device (torque converter or the like). In this embodiment, a torque converter TC is provided. Hence, the driving force of the engine EG is input to the main shaft 10 through the torque converter TC.

The output member 11 includes a gear concentric to the main shaft 10. The counter shaft 13 includes a gear that meshes with the gear. The rotation of the main shaft 10 changes its speed through transmission mechanisms to be described below and is then transmitted to the counter shaft 13. The rotation (driving force) of the counter shaft 13 is transmitted to driving wheels through, for example, differential gears and final reduction gears (not shown).

As the transmission mechanisms, the automatic transmission 1 includes planetary gear mechanisms P1 to P4 and engaging mechanisms C1 to C3, B1 to B3, and F1. In this embodiment, all the planetary gear mechanisms P1 to P4 are single pinion type planetary gear mechanisms. The planetary gear mechanisms P1 to P4 transmit the driving force from the main shaft 10 to the output member 11. The planetary gear mechanisms P1 to P4 can form a plurality of driving force transmission paths. The engaging mechanisms C1 to C3, B1 to B3, and F1 switch the driving force transmission paths of the planetary gear mechanisms P1 to P4, thereby establishing a plurality of gear ranges.

The planetary gear mechanisms P1 to P4 include sun gears S1 to S4, ring gears R1 to R4, and carriers Cr1 to Cr4 each supporting a pinion gear, respectively, as rotational elements (12 in total), and are disposed to be coaxial with respect to the main shaft 10.

When ordered in accordance with the arrangement order at intervals corresponding to gear ratios shown in the velocity diagram of FIG. 3 (to be described later), the sun gear S1, the carrier Cr1, and the ring gear R1 of the planetary gear mechanism P1 can be referred to as a first rotational element, a second rotational element, and a third rotational element in this order.

Similarly, the ring gear R2, the carrier Cr2, and the sun gear S2 of the planetary gear mechanism P2 can be referred to as a fourth rotational element, a fifth rotational element, and a sixth rotational element in this order.

Similarly, the sun gear S3, the carrier Cr3, and the ring gear R3 of the planetary gear mechanism P3 can be referred to as a seventh rotational element, an eighth rotational element, and a ninth rotational element in this order.

Similarly, the ring gear R4, the carrier Cr4, and the sun gear S4 of the planetary gear mechanism P4 can be referred to as a 10th rotational element, an 11th rotational element, and a 12th rotational element in this order.

Each of the engaging mechanisms C1 to C3, B1 to B3, and F1 functions as a clutch or a brake. A clutch connects/disconnects the rotational elements provided in the automatic transmission 1. A brake connects/disconnects rotational elements provided in the automatic transmission 1 to/from the casing 12. The rotational elements provided in the automatic transmission 1 include the main shaft 10 and the sun gears, ring gears, and carriers of the planetary gear mechanisms P1 to P4.

In this embodiment, the engaging mechanisms C1 to C3 are clutches, and the engaging mechanisms B1 to B3 and F1 are brakes. Hence, the engaging mechanisms C1 to C3 are sometimes called the clutches C1 to C3, and the engaging mechanisms B1 to B3 and F1 are sometimes called the brakes B1 to B3 and F1. When the engaging mechanisms C1 to C3 and B1 to B3 are switched between an engaging state (fastening state) and a release state, and the state of the engaging mechanism F1 is switched, the driving force transmission path from the main shaft 10 to the output member 11 is switched, and the plurality of gear ranges are implemented.

In this embodiment, all the engaging mechanisms C1 to C3 and B1 to B3 are assumed to be hydraulic friction engaging mechanisms. Examples of the hydraulic friction engaging mechanism are dry and wet single disc clutches and dry and wet multiple disc clutches. However, a meshing type engaging mechanism may be used.

The engaging mechanism F1 is provided between the casing 12 and predetermined rotational elements (here, the carriers Cr1 and Cr2 connected to each other). The engaging mechanism F1 can be switched between a one-way rotation permission state (to be sometimes referred to as OWC) in which the rotation of the predetermined rotational elements (carriers Cr1 and Cr2) is restricted only in one direction, and rotation in the reverse direction is permitted and a rotation inhibition state (to be sometimes referred to as TWC) in which rotation is restricted in both directions.

In the one-way rotation permission state, the same function as a so-called one-way clutch is implemented. In this state, the rotational elements transmit the driving force in one rotation direction but slip in the reverse direction. In this embodiment, the engaging mechanism F1 functions as a brake. For this reason, if the engaging mechanism F1 is in the one-way rotation permission state, the predetermined rotational elements (carriers Cr1 and Cr2) are permitted to rotate only in one direction. In the rotation inhibition state, the rotational elements transmit the driving force in both rotation directions. In this embodiment, the engaging mechanism F1 functions as a brake. For this reason, if the engaging mechanism F1 is in the rotation inhibition state, the predetermined rotational elements (carriers Cr1 and Cr2) are inhibited from rotating in both directions.

An example of the structure of the engaging mechanism F1 will be described later. For example, a known two-way clutch can be employed. Some known two-way clutches can be switched between the one-way rotation permission state, the rotation inhibition state, and a two-way rotation permission state by driving control of a corresponding hydraulic actuator or electromagnetic actuator. Some known two-way clutches can further switch the one-way rotation permission state between a forward rotation permission state and a reverse rotation permission state. In this embodiment, switching between the one-way rotation permission state and the rotation inhibition state suffices, and using only the permission state in one rotation direction as the one-way rotation permission state suffices. However, a two-way clutch capable of selecting another state such as the two-way rotation permission state may be employed.

The connection relationship between the components will be described next with reference to FIG. 1.

The sun gear S3 of the planetary gear mechanism P3 is connected to the main shaft 10. The ring gear R3 is connected to the sun gear S2 of the planetary gear mechanism P2. The carrier Cr3 is connected to the ring gear R1 of the planetary gear mechanism P1 and the carrier Cr4 of the planetary gear mechanism P4. The carrier Cr2 of the planetary gear mechanism P2 is connected to the carrier Cr1 of the planetary gear mechanism P1. The ring gear R2 is connected to the output member 11. Hence, the planetary gear mechanism P2 is a planetary gear mechanism that performs driving transmission to the counter shaft 13.

The clutch C1 connects the main shaft 10 to the carrier Cr1 of the planetary gear mechanism P1 and the carrier Cr2 connected to the carrier Cr1 in the engaging state, and disconnects them in the release state. Note that the release state will sometimes be referred to as a disengaging state. The clutch C2 connects the ring gear R3 of the planetary gear mechanism P3 to the sun gear S4 of the planetary gear mechanism P4 in the engaging state, and disconnects them in the release state. The clutch C3 connects the main shaft 10 to the ring gear R4 of the planetary gear mechanism P4 in the engaging state, and disconnects them in the release state.

The brake B1 connects the casing 12 to the sun gear S1 of the planetary gear mechanism P1 in the engaging state, and disconnects them in the release state. The brake B2 connects the casing 12 to the sun gear S4 of the planetary gear mechanism P4 in the engaging state, and disconnects them in the release state. The brake B3 connects the casing 12 to the ring gear R4 of the planetary gear mechanism P4 in the engaging state, and disconnects them in the release state.

As already described, the brake F1 restricts the rotation of the carrier Cr2 of the planetary gear mechanism P2 (and the carrier Cr1 connected to the carrier Cr2) only in one direction in the one-way rotation permission state, and fixes the carrier Cr2 of the planetary gear mechanism P2 (and the carrier Cr1 connected to the carrier Cr2) to the casing 12 in the rotation inhibition state.

FIG. 2A is an engagement table (fastening table) showing the engaging combination of the engaging mechanisms provided in the automatic transmission 1. FIG. 2B shows the gear ratios of the planetary gear mechanisms provided in the automatic transmission 1. FIG. 3 is a velocity diagram of the automatic transmission 1. "Gear ratio" in FIG. 2A indicates the gear ratio between the main shaft 10 and the output member 11.

In this embodiment, a running range that transmits the driving force to the wheel side and a non-running range that does not transmit the driving force are included in selectable shift ranges. In the running range, 10 forward ranges or gears (1st to 10th) and one reverse range or gear (RVS) can be established. "P/N" represents non-running ranges; "P", a parking range; and "N", a neutral range.

In the example of the engagement table shown in FIG. 2A, "○" indicates the engaging state, and no mark indicates the release state. Note that there are included engaging mechanisms that are set in the engaging state for smooth change to adjacent gear ranges, although the engagement is not essential to establish the gear ranges. For example, in the 1st gear (1st), engagement of the brake B2 is not essential. However, when changing to the reverse range (RVS) or 2nd gear (2nd), the brake B2 is set in the engaging state for the purpose of decreasing the engaging mechanisms to switch the engaging state. Similarly, in the 5th gear (5th), engagement of the clutch C3 is not essential. However, when changing to the 4th gear (4th) or 6th gear (6th), the clutch C3 is set in the engaging state for the purpose of decreasing the engaging mechanisms to switch the engaging state.

As for the brake F1, "○" indicates the rotation inhibition state, and "△" indicates the one-way rotation permission state. In the 1st gear (1st), the brake F1 can be set in either the rotation inhibition state or the one-way rotation permission state. In the rotation inhibition state, the engine brake is enabled. In the 1st gear, the brake F1 is set in the one-way rotation permission state. The engine brake is switched between the enabled state and a disabled state by engaging or releasing the brake B3. In FIG. 2A, "○" of the brake B3 in the 1st gear (1st) indicates this.

An algorithm to determine which state is set for the brake F1 in the 1st gear (1st) can appropriately be designed. In this embodiment, the state before a change to the 1st gear (1st) is inherited. For example, when changed from the reverse range (RVS) to the 1st gear (1st), the brake F1 remains in the rotation inhibition state in the 1st gear (1st). However, if, for example, the vehicle speed exceeds a predetermined speed, the brake F1 is switched to the one-way rotation permission state. Similarly, when changed from other forward ranges (2nd to 10th) to the 1st gear (1st), the brake F1 remains in the one-way rotation permission state in the 1st gear (1st).

In the non-running ranges (P/N) as well, the state of the brake F1 can be either the rotation inhibition state or the one-way rotation permission state. In this embodiment, the state before a change to the non-running ranges (P/N) is inherited, as in the 1st gear (1st).

In the 2nd gear (2nd) to the 10th gear (10th), the brake F1 is set in the one-way rotation permission state, but slips because of the structure of the automatic transmission 1. For this reason, the state of the brake F1 is indicated by "(Δ)". If the brake F1 is a mechanical engaging mechanism capable of selecting the above-described two-way rotation permission state, the brake F1 can also be set in the two-way rotation permission state in the 2nd gear (2nd) to the 10th gear (10th).

Note that in this embodiment, the one-way rotation permission state is selected as the state of the brake F1 in each of the 2nd gear (2nd) to the 10th gear (10th), and these ranges cannot be established in the rotation inhibition state. However, an arrangement that selects the rotation inhibition state can also be employed depending on the arrangement of the automatic transmission 1.

Figure 3:
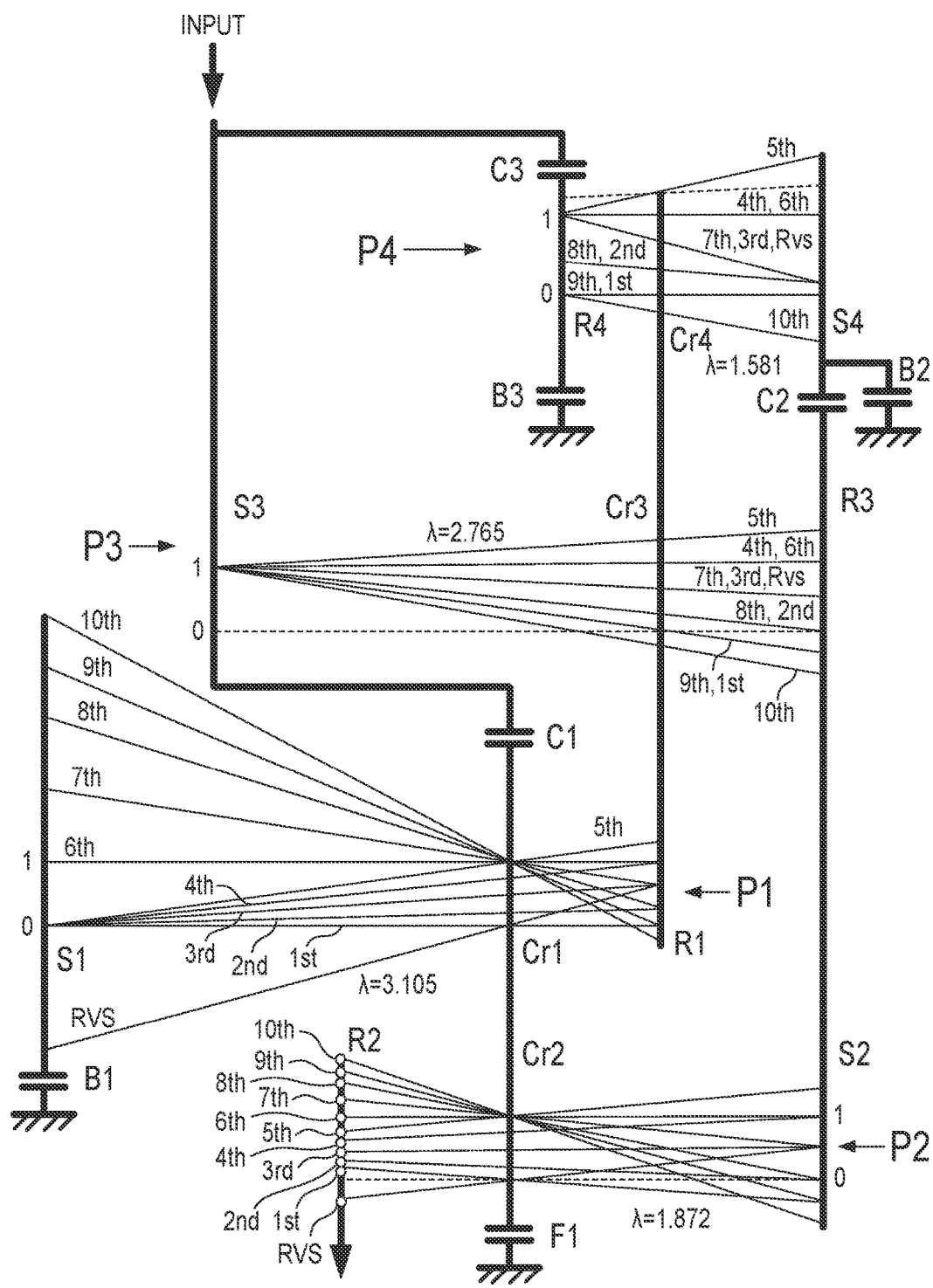
FIG. 3 is a velocity diagram of the automatic transmission shown in FIG. 1.

The velocity diagram of FIG. 3 shows the rotation speed ratio of each element to the input to the main shaft 10 in each gear range. The ordinate represents the speed ratio. "1" indicates the same rotation speed as the main shaft 10, and "0" indicates a stop state. The abscissa is based on the gear ratio between the rotational elements of the planetary gear mechanisms P1 to P4. λ is the gear ratio between a carrier Cr and a sun gear S. Note that in FIG. 3, elements corresponding to the counter shaft 13 are not illustrated.

Control System

Figure 4:
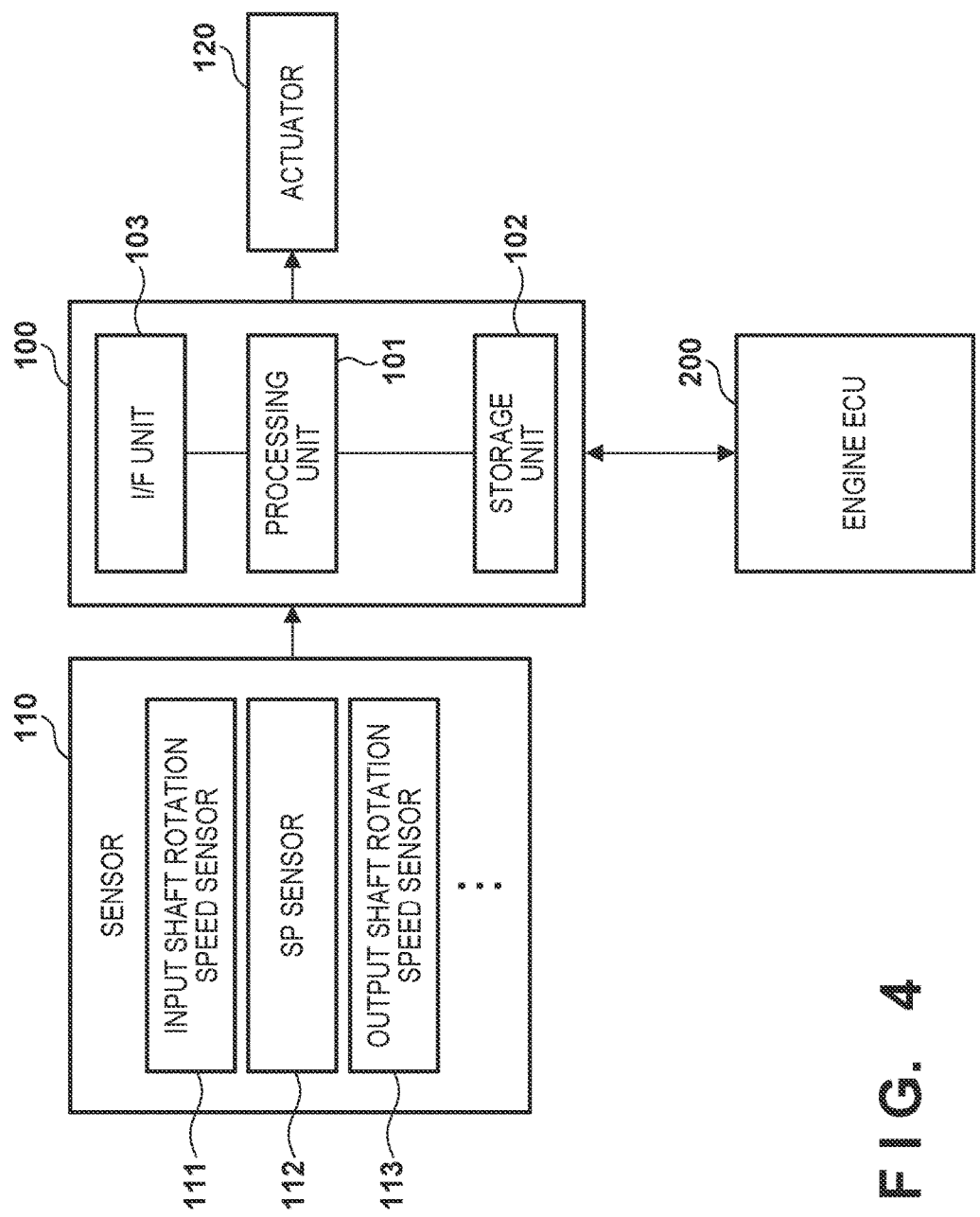
FIG. 4 is a block diagram of a control system.

FIG. 4 is a block diagram of the control apparatus of the automatic transmission 1. The control apparatus includes an ECU 100 that is communicably connected to an engine ECU 200 for controlling the engine EG, and controls the automatic transmission 1 including the torque converter TC.

The ECU 100 includes a processing unit 101 such as a CPU, a storage unit 102 such as a RAM and ROM, and an I/F unit 103 that interfaces between the processing unit 101 and an external device or the engine ECU 200. The I/F unit 103 is formed from, for example, a communication interface or an input/output interface.

The processing unit 101 executes a program stored in the storage unit 102 and controls various kinds of actuators 120 based on the detection results of various kinds of sensors 110.

The various kinds of sensors 110 include various kinds of sensors provided in the automatic transmission 1. FIG. 4 illustrates the following sensors. An input shaft rotation speed sensor 111 is a sensor that detects the rotation speed of the main shaft 10. The rotation speed of the main shaft 10 will sometimes be referred to as NM.

An SP sensor (shift position sensor) 112 is a sensor that detects a shift position selected by the driver. In this embodiment, four types of shift positions, that is, P range (parking range), D range (forward range), N range (neutral range), and R range (reverse range) are assumed as the shift positions. If the D range is selected, the processing unit 101 selects one of the 1st gear (1st) to the 10th gear (10th) in accordance with a gear change map stored in the storage unit 102 and changes the gear. If the R range is selected, the processing unit 101 selects the reverse range.

An output shaft rotation speed sensor 113 is a sensor that detects the rotation speed of the counter shaft 13. The rotation speed of the counter shaft 13 will sometimes be referred to as NC.

The various kinds of actuators 120 include various kinds of actuators provided in the automatic transmission 1. For example, the actuators 120 include an electromagnetic actuator such as an electromagnetic solenoid that switches the operation state of each of the engaging mechanisms C1 to C3, B1 to B3, and F1.

Like the ECU 100, the engine ECU 200 includes a processing unit such as a CPU, a storage unit such as a RAM and ROM, and an I/F unit that interfaces between the processing unit and an external device or the ECU 100. The engine ECU 200, for example, controls the output torque of the engine EG based on moment of inertia information received from the ECU 100.

The ECU 100 stores, in the storage unit 102, moment of inertia information to be transmitted to the ECU 200. The moment of inertia information represents the moment of inertia about the main shaft 10. When this information is provided to the ECU 200, the ECU 200 can calculate a load required of the engine EG and more properly control the output torque.

FIGS. 5A and 5B show examples of moment of inertia information. In this embodiment, the moment of inertia information is classified into information D1 during gear range establishment shown in FIG. 5A and information D2 during gear range switching (during switching of the engaging mechanisms) shown in FIG. 5B.

The moment of inertia about the main shaft 10 is the sum of the moment of inertia of the main shaft 10 itself and the moments of inertia of rotational elements that rotate together with the main shaft 10 and connecting members that connect the rotational elements on the main shaft 10. If the rotation ratio is different from that of the main shaft 10, the moment of inertia of a rotational element or a connecting member on the main shaft 10 can have a value obtained by dividing the moment of inertia of the rotational element itself or the connecting member itself by the square of the rotation ratio with respect to the main shaft 10. These values can be calculated in advance from the viewpoint of design. In this embodiment, as for the data structure, values calculated in advance are stored in the storage unit 102 in a table format, as shown in FIGS. 5A and 5B.

Since the transmission path of the driving force from the main shaft 10 to the counter shaft 13 is switched by the operation of the transmission mechanism, the moment of inertia about the main shaft 10 changes depending on the state of the transmission mechanism. In the example of the information D1 during gear range establishment shown in FIG. 5A, the information of the moment of inertia about the main shaft 10 is recorded for each gear range from the 1st gear to the 10th gear. It is possible to immediately extract the information of the moment of inertia corresponding to the selected gear range.

During steady rotation in which a gear range is established, when the main shaft 10 rotates, the counter shaft 13 also follows and rotates. Hence, the moments of inertia of the counter shaft 13 and predetermined rotational elements on the wheel side with respect to the counter shaft 13 are also included. The predetermined rotational elements on the wheel side can include, for example, final driven gears (final driven gears and differential gears).

On the other hand, during switching of the gear range, even when the main shaft 10 rotates, the counter shaft 13 does not follow and rotate (driving transmission is interrupted). Hence, the information D2 during gear range switching shown in FIG. 5B does not include the moments of inertia of the counter shaft 13 and predetermined rotational elements (same as the rotational elements included in the information during gear range establishment) on the wheel side with respect to the counter shaft 13. In the example of the information during gear range establishment shown in FIG. 5A, the information of the moment of inertia about the main shaft 10 is recorded for each gear range switching pattern (1st gear-2nd gear, 2nd gear-3rd gear, . . . ) It is possible to immediately extract the information of a moment of inertia corresponding to a state during a gear change.

Note that in FIGS. 5A and 5B, no information is defined for the reverse range. However, information can be defined for the reverse range.

Figure 6:
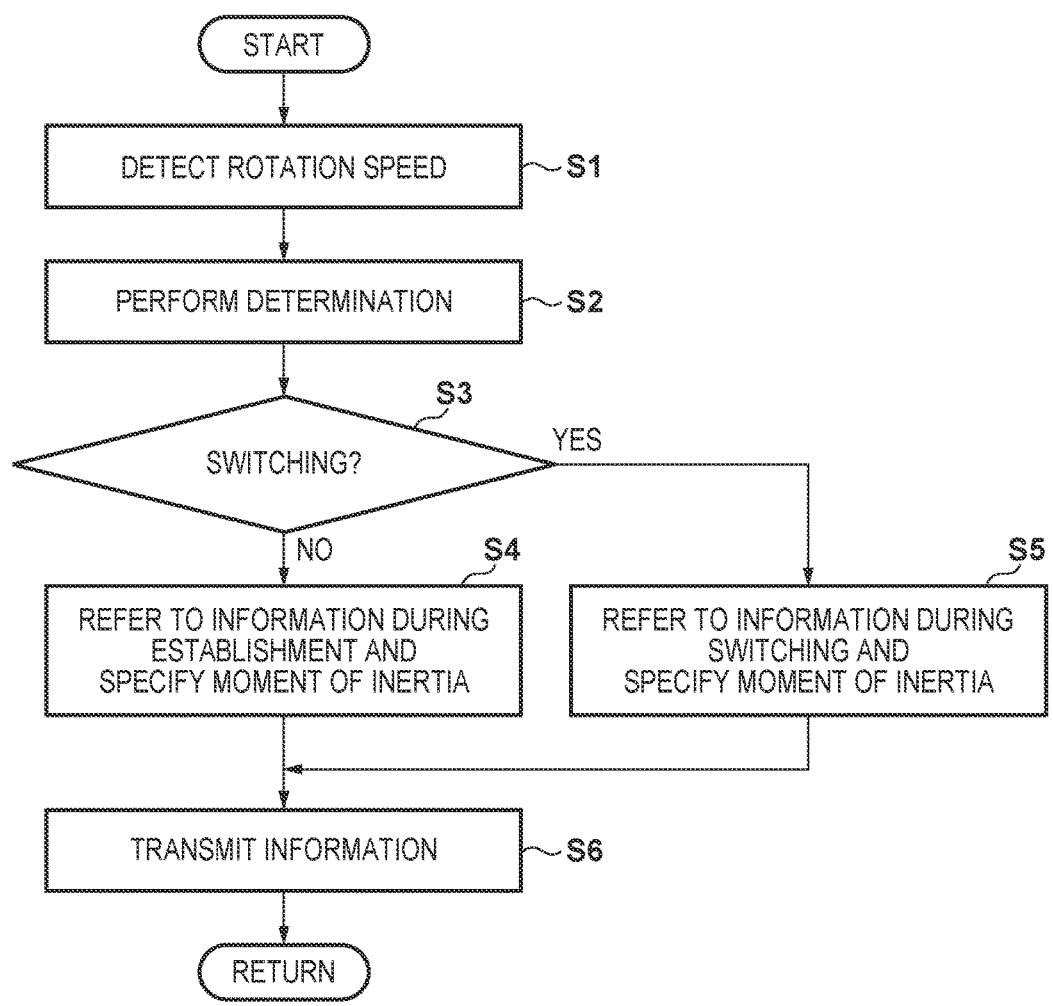
FIG. 6 is a flowchart showing an example of processing of an ECU.

FIG. 6 shows an example of processing executed by the ECU 100, and shows an example of processing of selecting moment of inertia information in accordance with the state of the automatic transmission 1 and transmitting it to the ECU 200.

Steps S1 and S2 are directed to processing of determining whether the gear range is being switched (the engaging mechanisms are being switched). This determination can also be done based on, for example, an oil pressure supplied to the engaging mechanisms. In this embodiment, however, the determination is performed based on the ratio (NM/NC) of the rotation speed of the main shaft 10 to the rotation speed of the counter shaft 13. This enables relatively correct determination.

In step S1, the detection results of the input shaft rotation speed sensor 111 and the output shaft rotation speed sensor 113 are acquired. In step S2, it is determined based on the value NM/NC whether the gear range is being switched. This determination will be described with reference to FIG. 7A.

FIG. 7A shows an assumption that the gear range is shifted down one by one from a kth gear. A reference ratio RT0 indicated by a broken line represents the value NM/NC during gear range establishment. An actual ratio RT1 indicated by a solid line represents the actual value NM/NC (the detection results of the sensors). The actual ratio RT1 gradually changes during gear range switching. A threshold TH1 used to determine the start of switching and a threshold TH2 used to determine completion of switching are set. The thresholds TH1 and TH2 are compared with the actual ratio RT1, thereby determining whether the gear range is being switched. In the example of FIG. 7A, from the kth gear to the (k−1)th gear, the period from time t1 to time t2 is determined as the period of gear range switching.

Referring back to FIG. 6, in step S3, in a case in which the gear range is not being switched (during establishment) based on the determination result in step S2, the process advances to step S4. During switching, the process advances to step S5. By the processes of steps S3 to S5, moment of inertia information used by the engine ECU 200 to control the engine EG is switched between the moment of inertia information D1 and the moment of inertia information D2.

In step S4, the moment of inertia information D1 is referred to, and moment of inertia information corresponding to the currently established gear range is specified. In step S5, the moment of inertia information D2 is referred to, and moment of inertia information corresponding to the current switching pattern is specified.

In step S6, the moment of inertia information specified in step S4 or S5 is transmitted to the engine ECU 200. The processing thus ends.

FIG. 7B is a view schematically showing the difference between a change IM' of the value in a case in which the moment of inertia information is not switched and a change IM of the value in a case in which the moment of inertia information is switched as in this embodiment. In the case in which the moment of inertia information is not switched (IM'), a case is assumed in which immediately after the start of gear range switching, moment of inertia information for the next range is selected. This corresponds to a case in which only the above-described moment of inertia information D1 is used.

As shown in FIG. 7B, during switching from kth gear→(k−1)th gear or during switching from (k−1)th gear→(k−2)th gear, the value is set to be higher in the change IM' than in the change IM, that is, the moments of inertia of the counter shaft 13 and the like are included. In the change IM, the moment of inertia can be made closer to the actual moment of inertia, and the accuracy of the information can be improved.

Note that in the above embodiment, an example in which the moment of inertia information is used for output torque control of the engine EG has been described. However, the control to apply is not limited to this, and the moment of inertia information can be used for various kinds of control that need the moment of inertia.

Summary of Embodiment

1. An automatic transmission (for example, 1) according to the above embodiment is an automatic transmission comprising:
a main shaft (for example, 10);
a counter shaft (for example, 13);
a transmission mechanism (for example, C1-C3, B1-B3, F1, P1-P4) capable of establishing a plurality of gear ranges by switching a transmission path of a driving force transmitted from the main shaft to the counter shaft by a combination of engagement and release of a plurality of engaging mechanisms;
a determination unit (for example, 100, S2) configured to determine whether the transmission mechanism is switching the gear range; and
a switching unit (for example, 100, S3-S5) configured to switch information of a moment of inertia about the main shaft, which is used for control, between first information during establishment of the gear range and second information during switching of the gear range based on a determination result of the determination unit.

According to this embodiment, it is possible to improve the accuracy of the information of the moment of inertia about the main shaft.

2. The automatic transmission (for example, 1) according to the above embodiment further comprises:

a first detection unit (for example, 111) configured to detect a rotation speed of the main shaft; and a second detection unit (for example, 113) configured to detect a rotation speed of the counter shaft, and the determination unit determines, based on a rotation speed ratio (for example, NM/NC) between the main shaft and the counter shaft based on detection results of the first detection unit and the second detection unit, whether the transmission mechanism is switching the gear range.

According to this embodiment, it is possible to relatively correctly determine whether the switching of the gear range is progressing.

3. In the above embodiment, the first information is information including moments of inertia of the counter shaft and a predetermined rotational element on a wheel side with respect to the counter shaft, and the second information is information excluding the moments of inertia of the counter shaft and the predetermined rotational element.

According to this embodiment, it is possible to make the information of the moment of inertia about the main shaft close to an actual moment of inertia.

4. In the above embodiment, the first information is information representing the moment of inertia about the main shaft for each gear range, and the second information is information representing the moment of inertia about the main shaft for each switching pattern of the gear range.

According to this embodiment, it is possible to immediately extract moment of inertia information corresponding to the current state.

5. The automatic transmission (for example, 1) according to the above embodiment further comprises a transmission unit (for example, 100, S6) configured to transmit the information switched by the switching unit to a control unit (for example, 200) of a driving source (for example, EG) configured to input the driving force to the automatic transmission, and the control is control of the driving source.

According to this embodiment, the moment of inertia information can be used for control of the driving source. The driving source may be a motor or the like in addition to an internal combustion engine.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefits of Japanese Patent Application No. 2017-050150, filed Mar. 15, 2017, which is hereby incorporated by reference herein in its entirety.

What is claimed is:

1. An automatic transmission comprising:

a main shaft;

a counter shaft;

a transmission mechanism capable of establishing a plurality of gear ranges by switching a transmission path of a driving force transmitted from the main shaft to the counter shaft by a combination of engagement and release of a plurality of engaging mechanisms;

a determination unit configured to determine whether the transmission mechanism is switching the gear range; and a switching unit configured to switch information of a moment of inertia about the main shaft, which is used for control, between first information during establishment of the gear range and second information during switching of the gear range based on a determination result of the determination unit.

2. The transmission according to claim 1, further comprising:

a first detection unit configured to detect a rotation speed of the main shaft; and a second detection unit configured to detect a rotation speed of the counter shaft, wherein the determination unit determines, based on a rotation speed ratio between the main shaft and the counter shaft based on detection results of the first detection unit and the second detection unit, whether the transmission mechanism is switching the gear range.

3. The transmission according to claim 1, wherein the first information is information including moments of inertia of the counter shaft and a predetermined rotational element on a wheel side with respect to the counter shaft, and the second information is information excluding the moments of inertia of the counter shaft and the predetermined rotational element.

4. The transmission according to claim 1, wherein the first information is information representing the moment of inertia about the main shaft for each gear range, and the second information is information representing the moment of inertia about the main shaft for each switching pattern of the gear range.

5. The transmission according to claim 1, further comprising a transmission unit configured to transmit the information switched by the switching unit to a control unit of a driving source configured to input the driving force to the automatic transmission, wherein the control is control of the driving source.

* * * * *